US008874250B2

(12) United States Patent
David et al.

(10) Patent No.: US 8,874,250 B2
(45) Date of Patent: Oct. 28, 2014

(54) SPECTROGRAPHIC MONITORING OF A SUBSTRATE DURING PROCESSING USING INDEX VALUES

(71) Applicant: Applied Materials, Inc., Santa Clara, CA (US)

(72) Inventors: Jeffrey Drue David, San Jose, CA (US); Dominic J. Benvegnu, Cupertino, CA (US); Harry Q. Lee, Los Altos, CA (US); Boguslaw A. Swedek, Cupertino, CA (US); Lakshmanan Karuppiah, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 14/046,237

(22) Filed: Oct. 4, 2013

(65) Prior Publication Data
US 2014/0039660 A1 Feb. 6, 2014

Related U.S. Application Data

(60) Continuation of application No. 13/599,766, filed on Aug. 30, 2012, now Pat. No. 8,554,351, which is a
(Continued)

(51) Int. Cl.
G06F 19/00 (2011.01)
B24B 49/00 (2012.01)
G01B 11/28 (2006.01)
B24B 49/12 (2006.01)
G05B 15/02 (2006.01)
B24B 37/013 (2012.01)

(52) U.S. Cl.
CPC ............... G05B 15/02 (2013.01); B24B 49/12 (2013.01); B24B 37/013 (2013.01)
USPC ........... 700/109; 700/121; 700/164; 700/175; 451/5; 451/6; 356/630

(58) Field of Classification Search
None
See application file for complete search history.

(56) References Cited

U.S. PATENT DOCUMENTS 5,365,340 A    11/1994   Ledger
5,486,129 A    1/1996    Sandhu et al.
(Continued)

FOREIGN PATENT DOCUMENTS

EP    1176631      1/2002
JP    H09-210636   8/1997
(Continued)

OTHER PUBLICATIONS

International Search Report and Written Opinion of the International Searching Authority, International Application Serial No. PCT/US2006/032659, May 16, 2007, 17pp.
(Continued)

Primary Examiner — Sean Shechtman
(74) Attorney, Agent, or Firm — Fish & Richardson P.C.

(57) ABSTRACT

Methods, systems, and apparatus for spectrographic monitoring of a substrate during chemical mechanical polishing are described. In one aspect, a computer-implemented method includes storing a library having a plurality of reference spectra, each reference spectrum of the plurality of reference spectra having a stored associated index value, measuring a sequence of spectra in-situ during polishing to obtain measured spectra, for each measured spectrum of the sequence of spectra, finding a best matching reference spectrum to generate a sequence of best matching reference spectra, determining the associated index value for each best matching spectrum from the sequence of best matching reference spectra to generate a sequence of index values, fitting a linear function to the sequence of index values, and halting the polishing either when the linear function matches or exceeds a target index or when the associated index value from the determining step matches or exceeds the target index.

18 Claims, 7 Drawing Sheets

Related U.S. Application Data continuation of application No. 12/699,014, filed on Feb. 2, 2010, now Pat. No. 8,260,446, which is a continuation-in-part of application No. 12/185,719, filed on Aug. 4, 2008, now Pat. No. 7,774,086, which is a continuation of application No. 11/748,825, filed on May 15, 2007, now Pat. No. 7,409,260, said application No. 12/699,014 is a continuation-in-part of application No. 12/182,076, filed on Jul. 29, 2008, now Pat. No. 8,088,298, which is a division of application No. 11/261,742, filed on Oct. 28, 2005, now Pat. No. 7,406,394, which is a continuation-in-part of application No. 11/213,344, filed on Aug. 26, 2005, now Pat. No. 7,764,377, said application No. 12/699,014 is a continuation-in-part of application No. 12/258,923, filed on Oct. 27, 2008, now Pat. No. 8,392,012, and a continuation-in-part of application No. 11/213,344, said application No. 11/748,825 is a continuation-in-part of application No. 11/213,344.

(60) Provisional application No. 60/747,768, filed on May 19, 2006, provisional application No. 60/710,682, filed on Aug. 22, 2005.

(56) References Cited

U.S. PATENT DOCUMENTS

| | | | |
|---|---|---|---|
| 5,595,526 A | 1/1997 | Yau et al. | |
| 5,747,380 A | 5/1998 | Yu et al. | |
| 5,893,796 A | 4/1999 | Birang et al. | |
| 6,153,116 A | 11/2000 | Yang et al. | |
| 6,172,756 B1 | 1/2001 | Chalmers et al. | |
| 6,184,985 B1 | 2/2001 | Chalmers et al. | |
| 6,190,234 B1 | 2/2001 | Swedek et al. | |
| 6,204,922 B1 | 3/2001 | Chalmers | |
| 6,271,047 B1 | 8/2001 | Ushio et al. | |
| 6,296,548 B1* | 10/2001 | Wiswesser et al. | 451/8 |
| 6,334,807 B1 | 1/2002 | Lebel et al. | |
| 6,358,327 B1 | 3/2002 | Pokhama et al. | |
| 6,361,646 B1 | 3/2002 | Bibby, Jr. et al. | |
| 6,464,563 B1 | 10/2002 | Lensing | |
| 6,464,824 B1 | 10/2002 | Hofmann et al. | |
| 6,489,624 B1 | 12/2002 | Ushio et al. | |
| 6,491,569 B2 | 12/2002 | Bibby et al. | |
| 6,511,363 B2 | 1/2003 | Yamane et al. | |
| 6,609,086 B1 | 8/2003 | Bao et al. | |
| 6,618,130 B2 | 9/2003 | Chen | |
| 6,623,991 B2 | 9/2003 | Johnson et al. | |
| 6,645,045 B2 | 11/2003 | Ohkawa | |
| 6,664,557 B1 | 12/2003 | Amartur | |
| 6,670,200 B2 | 12/2003 | Ushio et al. | |
| 6,676,482 B2 | 1/2004 | Bibby, Jr. et al. | |
| 6,678,046 B2 | 1/2004 | Opsal | |
| 6,678,055 B2 | 1/2004 | DuNour | |
| 6,762,838 B2 | 7/2004 | DuNour | |
| 6,768,967 B2 | 7/2004 | Johnson et al. | |
| 6,801,321 B1 | 10/2004 | DuNour | |
| 6,806,105 B2 | 10/2004 | Johnson et al. | |
| 6,806,948 B2 | 10/2004 | Katz et al. | |
| 6,813,034 B2 | 11/2004 | Rosencwaig et al. | |
| 6,819,426 B2 | 11/2004 | Sezginer et al. | |
| 6,836,328 B2 | 12/2004 | Opsal | |
| 6,842,259 B2 | 1/2005 | Rosencwaig et al. | |
| 6,885,467 B2 | 4/2005 | DuNour et al. | |
| 6,898,596 B2 | 5/2005 | Aikens et al. | |
| 6,908,374 B2 | 6/2005 | Wang et al. | |
| 6,947,135 B2 | 9/2005 | Johnson | |
| 6,995,842 B2 | 2/2006 | Opsal | |
| 7,018,271 B2 | 3/2006 | Wiswesser et al. | |
| 7,042,581 B2 | 5/2006 | Schietinger et al. | |
| 7,097,537 B1 | 8/2006 | David et al. | |
| 7,255,771 B2 | 8/2007 | Chen et al. | |
| 7,406,394 B2 | 7/2008 | Swedeck et al. | |
| 7,409,260 B2 | 8/2008 | David et al. | |
| 7,764,377 B2 | 7/2010 | Benvegnu et al. | |
| 8,260,446 B2 | 9/2012 | David et al. | |
| 8,554,351 B2* | 10/2013 | David et al. | 700/109 |
| 2001/0039064 A1 | 11/2001 | Ushio et al. | |
| 2002/0013007 A1 | 1/2002 | Hasegawa et al. | |
| 2002/0030826 A1 | 3/2002 | Chalmers et al. | |
| 2002/0115380 A1 | 8/2002 | Yamane et al. | |
| 2002/0127951 A1 | 9/2002 | Ishikawa et al. | |
| 2002/0155789 A1 | 10/2002 | Bibby, Jr. et al. | |
| 2002/0173084 A1 | 11/2002 | Ohkawa | |
| 2002/0173225 A1 | 11/2002 | Wang et al. | |
| 2003/0002032 A1 | 1/2003 | DuNour | |
| 2003/0022400 A1 | 1/2003 | Nomoto et al. | |
| 2003/0053042 A1 | 3/2003 | Chen | |
| 2003/0098704 A1 | 5/2003 | DuNour et al. | |
| 2003/0153246 A1 | 8/2003 | Desai et al. | |
| 2003/0184732 A1 | 10/2003 | Katz et al. | |
| 2003/0205664 A1 | 11/2003 | Abe et al. | |
| 2004/0070773 A1 | 4/2004 | Hirose et al. | |
| 2004/0080761 A1 | 4/2004 | DuNour et al. | |
| 2004/0085539 A1 | 5/2004 | Opsal | |
| 2004/0092047 A1 | 5/2004 | Lymberopoulos et al. | |
| 2005/0026542 A1 | 2/2005 | Battal et al. | |
| 2005/0105089 A1 | 5/2005 | Opsal | |
| 2005/0117164 A1 | 6/2005 | Nomoto et al. | |
| 2005/0211377 A1 | 9/2005 | Chen et al. | |
| 2006/0009131 A1 | 1/2006 | Swedek et al. | |
| 2006/0020419 A1 | 1/2006 | Benvegnu | |
| 2006/0246683 A1 | 11/2006 | Pan et al. | |
| 2006/0274326 A1 | 12/2006 | Kobayashi et al. | |
| 2007/0039925 A1 | 2/2007 | Swedek et al. | |
| 2007/0042675 A1 | 2/2007 | Benvegnu et al. | |
| 2007/0224915 A1 | 9/2007 | David et al. | |
| 2008/0099443 A1 | 5/2008 | Benvegnu et al. | |
| 2008/0139087 A1 | 6/2008 | Togawa et al. | |
| 2008/0206993 A1 | 8/2008 | Lee et al. | |
| 2009/0275265 A1 | 11/2009 | Qian et al. | |
| 2010/0103422 A1 | 4/2010 | David et al. | |
| 2010/0114532 A1 | 5/2010 | David et al. | |

FOREIGN PATENT DOCUMENTS

| | | |
|---|---|---|
| JP | H11-033901 | 2/1999 |
| JP | 2000-009437 | 1/2000 |
| JP | 2000-183001 | 6/2000 |
| JP | 2000-310512 | 11/2000 |
| JP | 2000-326221 | 11/2000 |
| JP | 2001-284424 | 10/2001 |
| JP | 2001-287159 | 10/2001 |
| JP | 2001-345299 | 12/2001 |
| JP | 2002-009030 | 1/2002 |
| JP | 2002-517911 | 6/2002 |
| JP | 2002-359217 | 12/2002 |
| JP | 2003-080451 | 3/2003 |
| JP | 2004-017229 | 1/2004 |
| JP | 2004-165473 | 6/2004 |
| JP | 2005-011977 | 1/2005 |
| JP | 2005-101114 | 4/2005 |
| JP | 2005-159203 | 6/2005 |
| TW | 541233 | 7/2003 |
| WO | WO 99/64205 | 12/1999 |
| WO | WO00/54935 | 9/2000 |
| WO | WO01/72470 | 10/2001 |
| WO | 2004/035265 | 4/2004 |

OTHER PUBLICATIONS

Chinese Office Action in Application Serial No. 20060030404.9 mailed Jul. 8, 2011, 7pp.

USPTO Non-Final Office Action in U.S. Appl. No. 11/213,344, mailed Mar. 10, 2009, 19 pp.

Annex to Form PCT/ISA/206, Communication relating to the Results of the Partial International Search, International Application Bo. PCT/US2006/032659, Feb. 6, 2007, 3pp.

Office Action in JP Application No. 2012-220634, Issued Jan. 21, 2014, 4 pages with English Translation.

* cited by examiner

SPECTROGRAPHIC MONITORING OF A SUBSTRATE DURING PROCESSING USING INDEX VALUES

CROSS REFERENCE TO RELATED APPLICATIONS

This application is a continuation of U.S. application Ser. No. 13/599,766, filed Aug. 30, 2012, which is a continuation of U.S. application Ser. No. 12/699,014, filed Feb. 2, 2010, which is a continuation-in-part of U.S. application Ser. No. 12/185,719, filed Aug. 4, 2008, which is a continuation of U.S. application Ser. No. 11/748,825, filed May 15, 2007, which claims priority of U.S. Provisional Application Ser. No. 60/747,768, filed May 19, 2006. U.S. application Ser. No. 12/699,014 is also a continuation-in-part of U.S. application Ser. No. 12/182,076, filed Jul. 29, 2008, which is a divisional of U.S. application Ser. No. 11/261,742, filed Oct. 28, 2005. U.S. application Ser. No. 12/699,014, U.S. application Ser. No. 11/748,825, and U.S. application Ser. No. 11/261,742 are continuation-in-part applications of U.S. application Ser. No. 11/213,344, filed Aug. 26, 2005, which claim priority to U.S. Provisional Application Ser. No. 60/710,682, filed Aug. 22, 2005. U.S. application Ser. No. 12/699,014 is also a continuation-in-part of U.S. application Ser. No. 12/258,923, filed Oct. 27, 2008. The disclosure of each prior application is considered part of and is incorporated by reference in the disclosure of this application.

BACKGROUND

The present specification relates generally to spectrographic monitoring of a substrate during chemical mechanical polishing.

An integrated circuit is typically formed on a substrate by the sequential deposition of conductive, semiconductive, or insulative layers on a silicon wafer. One fabrication step involves depositing a filler layer over a non-planar surface and planarizing the filler layer. For certain applications, the filler layer is planarized until the top surface of a patterned layer is exposed. A conductive filler layer, for example, can be deposited on a patterned insulative layer to fill the trenches or holes in the insulative layer. After planarization, the portions of the conductive layer remaining between the raised pattern of the insulative layer form vias, plugs, and lines that provide conductive paths between thin film circuits on the substrate. For other applications, such as oxide polishing, the filler layer is planarized until a predetermined thickness is left over the non planar surface. In addition, planarization of the substrate surface is usually required for photolithography.

Chemical mechanical polishing (CMP) is one accepted method of planarization. This planarization method typically requires that the substrate be mounted on a carrier or polishing head. The exposed surface of the substrate is typically placed against a rotating polishing disk pad or belt pad. The polishing pad can be either a standard pad or a fixed abrasive pad. A standard pad has a durable roughened surface, whereas a fixed-abrasive pad has abrasive particles held in a containment media. The carrier head provides a controllable load on the substrate to push it against the polishing pad. A polishing liquid, such as a slurry with abrasive particles, is typically supplied to the surface of the polishing pad.

One problem in CMP is determining whether the polishing process is complete, i.e., whether a substrate layer has been planarized to a desired flatness or thickness, or when a desired amount of material has been removed. Overpolishing (removing too much) of a conductive layer or film leads to increased circuit resistance. On the other hand, underpolishing (removing too little) of a conductive layer leads to electrical shorting. Variations in the initial thickness of the substrate layer, the slurry composition, the polishing pad condition, the relative speed between the polishing pad and the substrate, and the load on the substrate can cause variations in the material removal rate in different zones of the substrate, for example. These variations cause variations in the time needed to reach the polishing endpoint. Therefore, the polishing endpoint cannot be determined merely as a function of polishing time.

SUMMARY

In general, one aspect of the subject matter described in this specification can be embodied in a computer-implemented method that includes storing a library having a plurality of reference spectra, each reference spectrum of the plurality of reference spectra having a stored associated index value, measuring a sequence of spectra in-situ during polishing to obtain measured spectra, for each measured spectrum of the sequence of spectra, finding a best matching reference spectrum to generate a sequence of best matching reference spectra, determining the associated index value for each best matching spectrum from the sequence of best matching reference spectra to generate a sequence of index values, fitting a linear function to the sequence of index values, and halting the polishing either when the linear function matches or exceeds a target index or when the associated index value from the determining step matches or exceeds the target index.

In general, another aspect of the subject matter described in this specification can be embodied in a computer-implemented method that includes obtaining a sequence of current spectra from a substrate undergoing polishing, storing a plurality of predetermined spectra and a plurality of index values, each spectrum from the plurality of predetermined spectra associated with an index value representative of a degree of polishing, for each current spectrum in the sequence, selecting a particular spectrum from the plurality of predetermined spectra that best fits the current spectrum and determining the index value of the particular spectrum that is the best fit to create a sequence of index values, determining a polishing endpoint using the sequence of index values, and halting the polishing when the polishing endpoint is reached.

A computer readable storage device storing a computer program, which, when executed by a computer processor, causes the computer processor to perform operations laid out in the computer implemented methods described herein, is also described.

As used in the instant specification, the term substrate can include, for example, a product substrate (e.g., which can include multiple memory or processor dies), a test substrate, a bare substrate, and a gating substrate. The substrate can be at various stages of integrated circuit fabrication, e.g., the substrate can be a bare wafer, or it can include one or more deposited and/or patterned layers. The term substrate can include circular disks and rectangular sheets.

Possible advantages of implementations of the invention can include the following. The endpoint detection system can be less sensitive to variations between zones of a substrate in the underlying layers or pattern, and thus reliability of the endpoint system to detect a desired polishing endpoint for each zone can be improved. As a result, thickness uniformity of a wafer can be improved.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Substrates, particularly device substrates, can have different zones with different characteristics, e.g., different feature densities or underlying layer thicknesses. Consequently, during spectrographic monitoring performed in-situ during polishing, measured spectra for some zones may not reliably match to reference spectra that were established based on data from other zones.

This problem can be addressed by using multiple libraries representing different zones within a substrate. A sequence of current spectra of reflected light can be measured for each of a plurality of zones of a substrate, and spectra from the sequences for different zones can be compared to reference spectra from different spectra libraries to generate best-match reference spectra which can be used for endpoint determination.

Figure 1:
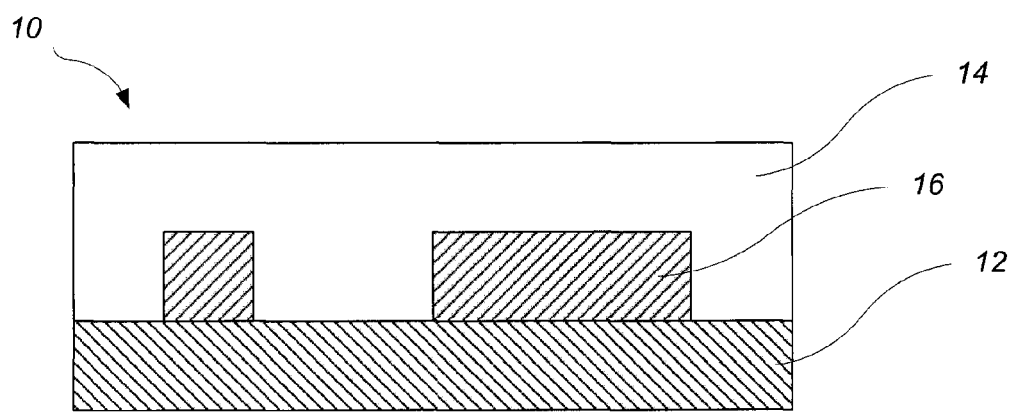
FIG. 1 shows an example cross-section of a portion of a substrate.

Referring to FIG. 1, a substrate 10 can include a wafer 12, an outermost layer 14 that will undergo polishing, and one or more underlying layers 16, some of which are typically patterned, between the outermost layer 14 and the wafer 12. For example, the outermost layer 14 and an immediately adjacent underlying layer 16 can both be dielectrics, e.g., the outermost layer 14 can be an oxide and the immediately adjacent underlying layer 16 can be a nitride. Other layers, such as other conductive and dielectric layers, can be formed between the immediately adjacent underlying layer and the substrate.

One potential problem with spectrographic endpoint detection during chemical mechanical polishing, particularly spectrographic endpoint detection where both the outermost layer 14 and the underlying layer 16 are dielectrics, is that the thickness(es) of the underlying layer(s) can vary from zone to zone on a substrate. A substrate can have multiple zones, such as a center zone, a middle zone and an edge zone. For example, on a 300 mm wafer, the center zone can extend from the center to a radius of 50 mm, the middle zone can extend from a radius of 50 mm to about 100 mm and the edge can extend from about 100 mm to about 150 mm. In some implementations, the substrate has more or fewer zones than the three mentioned.

As a result of the variations, zones on a substrate in which the outermost layer has the same thickness can actually reflect different spectra, depending on the underlying layer(s). Consequently, a target spectrum used to trigger a polishing endpoint for some zones of the substrate may not function properly for other zones of the substrate, e.g., if the underlying layers have different thicknesses. However, it is possible to compensate for this effect by comparing spectra obtained during polishing against multiple spectra, where the multiple spectra represent variations in the underlying layer(s).

Variations can also inherently exist between reference spectra that are determined using one zone on the substrate versus another due to variations between zones other than underlying layer thickness, such as variations in the starting thickness of the outermost layer undergoing polishing, variations in the thickness of the outermost layer (e.g., due to different polishing rates in each zone) during polishing, variations in the optical properties of the environment, variations in the pattern of the underlying layer, e.g., line width (e.g., metal or polysilicon line width), or variations in composition of the layers. However, it is similarly possible to compensate for this effect by comparing spectra obtained during polishing against multiple spectra, where the multiple spectra represent other variations between the substrates.

In addition, it is possible to compensate for variations using multiple libraries of reference spectra. Within each library are multiple reference spectra representing substrates (or zones) with variations in the thickness of the outermost layer but with otherwise similar characteristics, e.g., similar underlying layer thickness. Between libraries, other variations, such as variations in thickness of underlying layer(s), can be represented, e.g., different libraries include reference spectra representing substrates (or zones) with different thickness of underlying layer(s).

Figure 2:
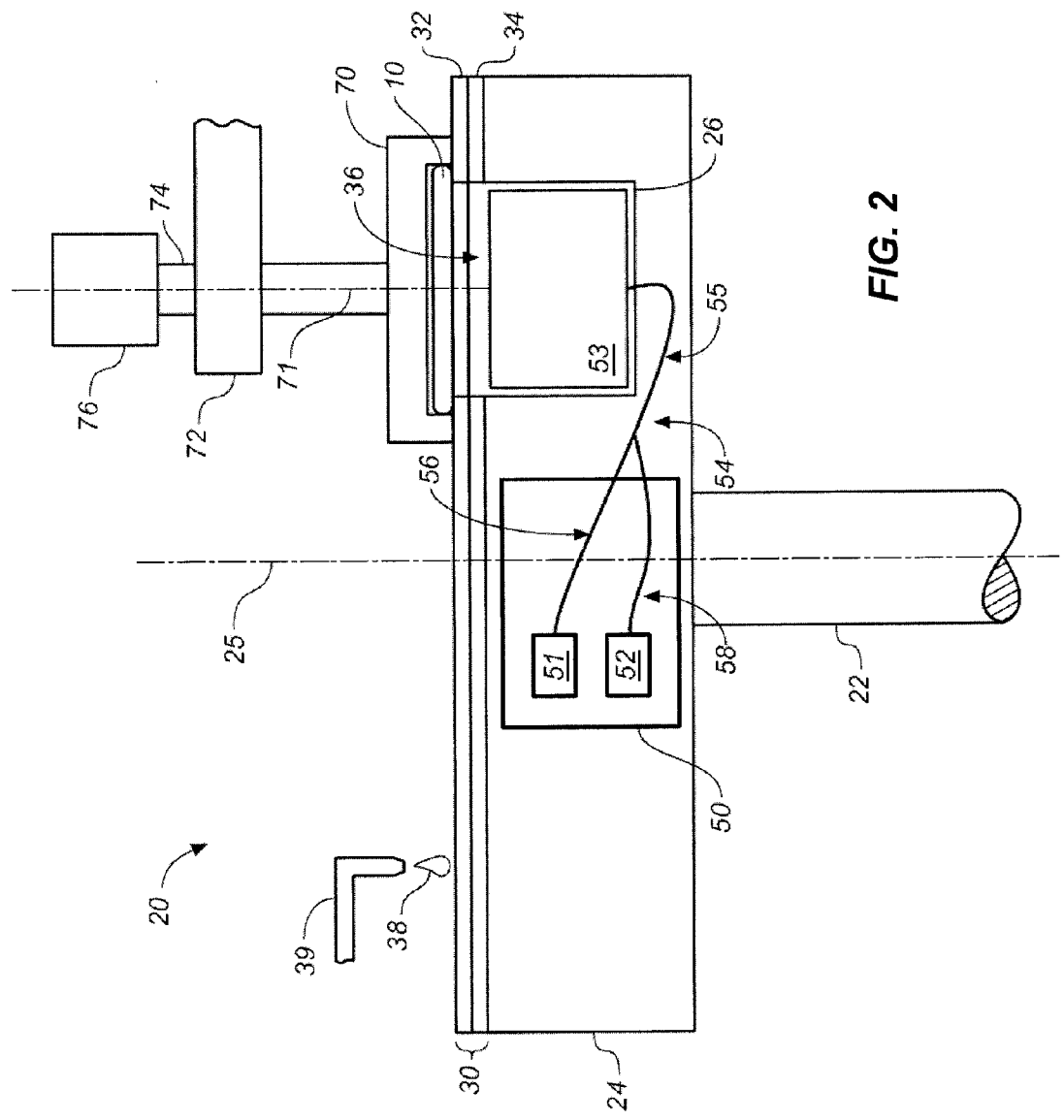
FIG. 2 is a cross-sectional view illustrating an example of a polishing apparatus.

FIG. 2 is a cross-sectional view illustrating an example of a polishing apparatus 20. The polishing apparatus 20 includes a rotatable disk-shaped platen 24, on which a polishing pad 30 is situated. The platen is operable to rotate about an axis 25. For example, a motor can turn a drive shaft 22 to rotate the platen 24.

An optical access 36 through the polishing pad is provided by including an aperture (i.e., a hole that runs through the pad) or a solid window. The solid window can be secured to the polishing pad, although in some implementations the solid window can be supported on the platen 24 and project into an aperture in the polishing pad. The polishing pad 30 is usually placed on the platen 24 so that the aperture or window overlies an optical head 53 situated in a recess 26 of the platen 24. The optical head 53 consequently has optical access through the aperture or window to a substrate being polished. The optical head is further described below.

The polishing apparatus 20 includes a combined slurry/rinse arm 39. During polishing, the arm 39 is operable to dispense a polishing liquid 38, such as a slurry. Alternatively, the polishing apparatus includes a slurry port operable to dispense slurry onto the polishing pad 30.

The polishing apparatus 20 includes a carrier head 70 operable to hold the substrate 10 against the polishing pad 30. The carrier head 70 is suspended from a support structure 72, for example, a carousel, and is connected by a carrier drive shaft 74 to a carrier head rotation motor 76 so that the carrier head can rotate about an axis 71. In addition, the carrier head 70 can oscillate laterally in a radial slot formed in the support structure 72. In operation, the platen is rotated about its central axis 25, and the carrier head is rotated about its central axis 71 and translated laterally across the top surface of the polishing pad.

The polishing apparatus also includes an optical monitoring system, which can be used to determine whether to adjust a polishing rate or an adjustment for the polishing rate as discussed below. The optical monitoring system includes a light source 51 and a light detector 52. Light passes from the light source 51, through the optical access 36 in the polishing pad 30, impinges and is reflected from the substrate 10 back through the optical access 36, and travels to the light detector 52.

A bifurcated optical cable 54 can be used to transmit the light from the light source 51 to the optical access 36 and back from the optical access 36 to the light detector 52. The bifurcated optical cable 54 can include a "trunk" 55 and two "branches" 56 and 58.

As mentioned above, the platen 24 includes the recess 26, in which the optical head 53 is situated. The optical head 53 holds one end of the trunk 55 of the bifurcated fiber cable 54, which is configured to convey light to and from a substrate surface being polished. The optical head 53 can include one or more lenses or a window overlying the end of the bifurcated fiber cable 54. Alternatively, the optical head 53 can merely hold the end of the trunk 55 adjacent the solid window in the polishing pad.

The platen includes a removable in-situ monitoring module 50. The in-situ monitoring module 50 can include one or more of the following: the light source 51, the light detector 52, and circuitry for sending and receiving signals to and from the light source 51 and light detector 52. For example, the output of the detector 52 can be a digital electronic signal that passes through a rotary coupler, e.g., a slip ring, in the drive shaft 22 to a controller 60, such as a computer, for the optical monitoring system. Similarly, the light source can be turned on or off in response to control commands in digital electronic signals that pass from the controller through the rotary coupler to the module 50.

The in-situ monitoring module can also hold the respective ends of the branch portions 56 and 58 of the bifurcated optical fiber 54. The light source is operable to transmit light, which is conveyed through the branch 56 and out the end of the trunk 55 located in the optical head 53, and which impinges on a substrate being polished. Light reflected from the substrate is received at the end of the trunk 55 located in the optical head 53 and conveyed through the branch 58 to the light detector 52.

The light source 51 is operable to emit white light. In one implementation, the white light emitted includes light having wavelengths of 200-800 nanometers. A suitable light source is a xenon lamp or a xenon mercury lamp.

The light detector 52 can be a spectrometer. A spectrometer is basically an optical instrument for measuring intensity of light over a portion of the electromagnetic spectrum. A suitable spectrometer is a grating spectrometer. Typical output for a spectrometer is the intensity of the light as a function of wavelength (or frequency).

The light source 51 and light detector 52 are connected to a computing device, e.g., the controller 60, operable to control their operation and to receive their signals. The computing device can include a microprocessor situated near the polishing apparatus, e.g., a personal computer. With respect to control, the computing device can, for example, synchronize activation of the light source 51 with the rotation of the platen 24.

Figure 3:
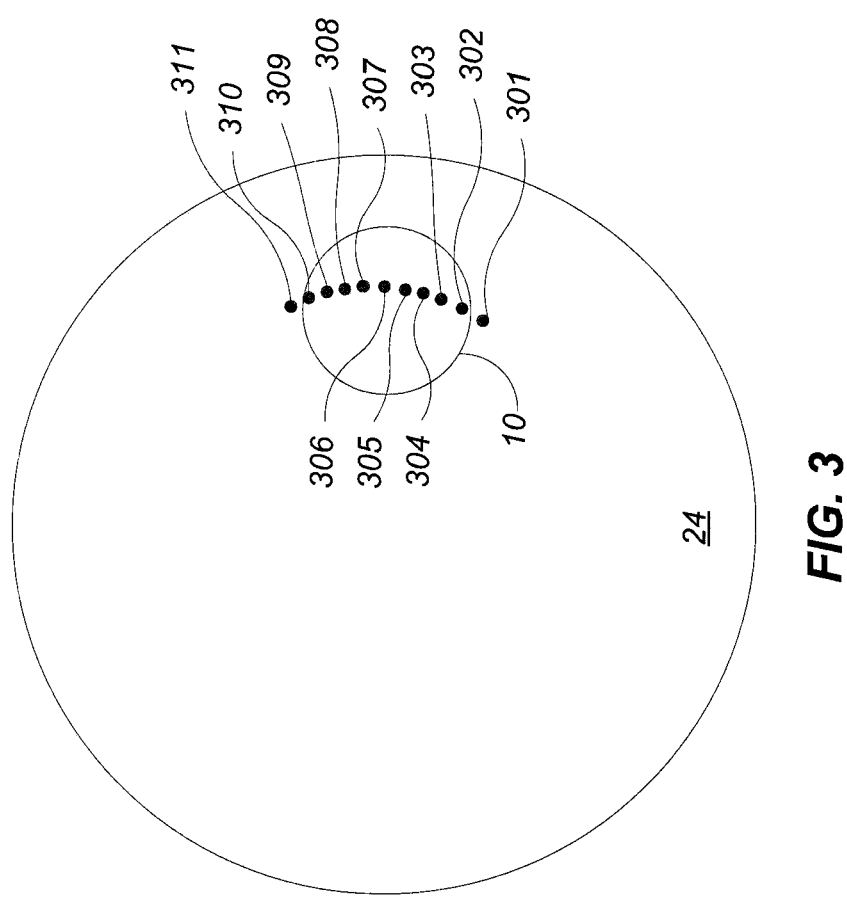
FIG. 3 is an overhead view of an example rotating platen illustrating locations of in-situ measurements.

As shown in FIG. 3, as the platen rotates, the computer can cause the light source 51 to emit a series of flashes starting just before and ending just after the substrate 10 passes over the in-situ monitoring module (each of points 301-311 depicted represents a location where light from the in-situ monitoring module impinged and reflected off.) Alternatively, the computer can cause the light source 51 to emit light continuously starting just before and ending just after the substrate 10 passes over the in-situ monitoring module. In either case, the signal from the detector can be integrated over a sampling period to generate spectra measurements at a sampling frequency. The sampling frequency can be about 3 to 100 milliseconds. Although not shown, each time the substrate 10 passes over the monitoring module, the alignment of the substrate with the monitoring module can be different than in the previous pass. Over one rotation of the platen, spectra are obtained from different radii on the substrate. That is, some spectra are obtained from locations closer to the center of the substrate and some are closer to the edge. In addition, over multiple rotations of the platen, a sequence of spectra can be obtained over time.

In operation, the computing device can receive, for example, a signal that carries information describing a spectrum of the light received by the light detector 52 for a particular flash of the light source or time frame of the detector. Thus, this spectrum is a spectrum measured in-situ during polishing.

Without being limited to any particular theory, the spectrum of light reflected from the substrate 10 evolves as polishing progresses due to changes in the thickness of the outermost layer, thus yielding a sequence of time-varying spectra. Moreover, particular spectra are exhibited by particular thicknesses of the layer stack.

The computing device can process the signal to determine an endpoint of a polishing step. In particular, the computing device can execute logic that determines, based on the measured spectra, when an endpoint has been reached.

In brief, the computing device can compare the measured spectra to multiple reference spectra, and can use the results of the comparison to determine when an endpoint has been reached.

As used herein, a reference spectrum is a predefined spectrum generated prior to polishing of the substrate. A reference spectrum can have a pre-defined association, i.e., defined prior to the polishing operation, with a value of a substrate property, such as a thickness of the outermost layer. Alternatively or in addition, the reference spectrum can have a predefined association with a value representing a time in the polishing process at which the spectrum is expected to appear, assuming that the actual polishing rate follows an expected polishing rate.

A reference spectrum can be generated empirically, e.g., by measuring the spectrum from a test substrate having a known layer thicknesses, or generated from theory. For example, to determine a reference spectrum, a spectrum of a "set-up" substrate with the same pattern as the product substrate can be measured pre-polish at a metrology station. A substrate property, e.g., the thickness of the outermost layer, can also be measured pre-polish with the same metrology station or a different metrology station. The set-up substrate is then polished while spectra are collected. For each spectrum, a value is recorded representing the time in the polishing process at which the spectrum was collected. For example, the value can be an elapsed time, or a number of platen rotations. The substrate can be overpolished, i.e., polished past a desired thickness, so that the spectrum of the light that reflected from the substrate when the target thickness is achieved can be obtained. The spectrum and property, e.g., thickness of the outermost layer, of the set-up substrate can then be measured post-polish at a metrology station.

Optionally, the set-up substrate can be removed periodically from the polishing system, and its properties and/or spectrum measured at a metrology station, before being returned to polishing. A value can also be recorded representing the time in the polishing process at which the spectrum is measured at the metrology station.

The reference spectra are stored in a library. The reference spectra in the library represent substrates with a variety of different thicknesses in the outer layer.

Multiple libraries can be created from different set-up substrates that differ in characteristics other than the thickness of the outermost layer, e.g., that differ in underlying layer thickness, underlying layer pattern, or outer or underlying layer composition.

The measured thicknesses and the collected spectra are used to select, from among the collected spectra, one or more spectra determined to be exhibited by the substrate when it had a thickness of interest. In particular, linear interpolation can be performed using the measured pre-polish film thickness and post-polish substrate thicknesses (or other thicknesses measured at the metrology station) to determine the time and corresponding spectrum exhibited when the target thickness was achieved. The spectrum or spectra determined to be exhibited when the target thickness was achieved are designated to be the target spectrum or target spectra.

In some implementations, the target spectrum is the spectrum that corresponds to the thickness of interest when polishing is complete. A layer thickness when polishing is complete can be that the layer has been completely removed or that the layer continues to exist and has some predetermined thickness. The predetermined thickness is not limited to any particular thickness. In some implementations, the layer thickness when a polishing endpoint is determined or when a signal is sent to halt polishing is greater than the desired final thickness of the layer. Because there can be a lapse between the time that the polishing apparatus is to be halted and the time that polishing actually stops, the target layer thickness can be greater than the desired ending thickness to account for the polishing that occurs between determining to halt polishing or the stop signal being sent and the polishing actually stopping. The index value that corresponds to the target spectrum can be the endpoint index value.

In addition, assuming a uniform polishing rate a thickness of the outermost layer can be calculated for each spectrum collected in-situ using linear interpolation between the measured pre-polish film thickness and post-polish substrate thicknesses (or other thicknesses measured at the metrology station) based on the time at which the spectrum was collected.

In addition to being determined empirically, some or all of the reference spectra can be calculated from theory, e.g., using an optical model of the substrate layers. For example, and optical model can be used to calculate a spectrum for a given outer layer thickness D. A value representing the time in the polishing process at which the spectrum would be collected can be calculated, e.g., by assuming that the outer layer is removed at a uniform polishing rate. For example, the time Ts for a particular spectrum can be calculated simply by assuming a starting thickness D0 and uniform polishing rate R (Ts=(D0−D)/R). As another example, linear interpolation between measurement times T1, T2 for the pre-polish and post-polish thicknesses D1, D2 (or other thicknesses measured at the metrology station) based on the thickness D used for the optical model can be performed (Ts=T2−T1*(D1−D)/(D1−D2)).

As used herein, a library of reference spectra is a collection of reference spectra which represent substrates that share a property in common (other than outer layer thickness). However, the property shared in common in a single library may vary across multiple libraries of reference spectra. For example, two different libraries can include reference spectra that represent substrates with two different underlying thicknesses.

Spectra for different libraries can be generated by polishing multiple "set-up" substrates with different substrate properties (e.g., underlying layer thicknesses, or layer composition) and collecting spectra as discussed above; the spectra from one set-up substrate can provide a first library and the spectra from another substrate with a different underlying layer thickness can provide a second library. Alternatively or in addition, reference spectra for different libraries can be calculated from theory, e.g., spectra for a first library can be calculated using the optical model with the underlying layer having a first thickness, and spectra for a second library can be calculated using the optical model with the underlying layer having a different one thickness.

In some implementations, each reference spectrum is assigned an index value. This index can be the value representing the time in the polishing process at which the reference spectrum is expected to be observed. The spectra can be indexed so that each spectrum in a particular library has a unique index value. The indexing can be implemented so that the index values are sequenced in an order in which the spectra were measured. An index value can be selected to change monotonically, e.g., increase or decrease, as polishing progresses. In particular, the index values of the reference spectra can be selected so that they form a linear function of time or number of platen rotations. For example, the index values can be proportional to a number of platen rotations. Thus, each index number can be a whole number, and the index number can represent the expected platen rotation at which the associated spectrum would appear.

The reference spectra and their associated indices can be stored in a library. The library can be implemented in memory of the computing device of the polishing apparatus. The index of the target spectrum can be designated as a target index.

During polishing, an index trace can be generated for each library. Each index trace includes a sequence of indices that form the trace, each particular index of the sequence associated with a particular measured spectrum. For the index trace of a given library, a particular index in the sequence is generated by selecting the index of the reference spectrum from the given library that is the closest fit to a particular measured spectrum.

Figure 4:
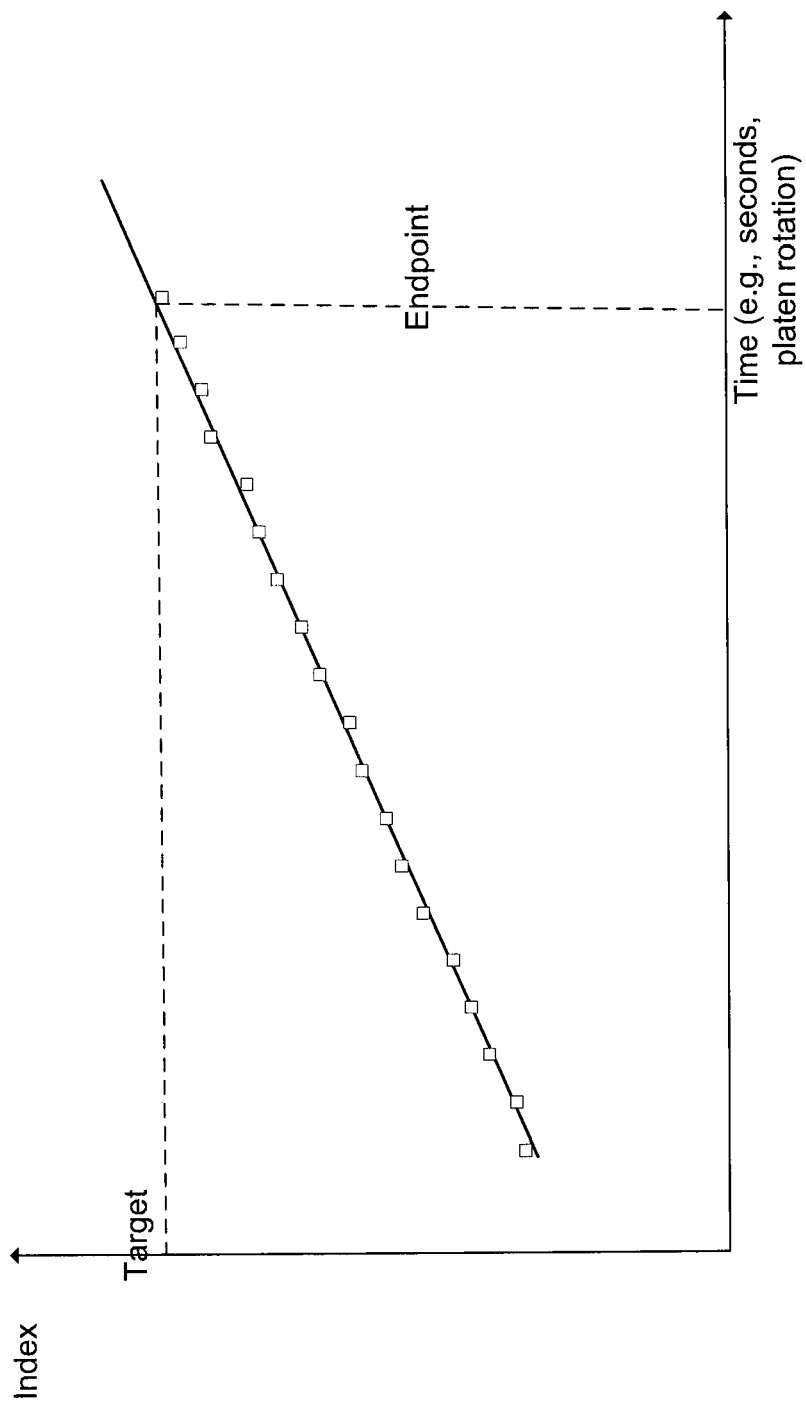
FIG. 4 is a schematic diagram illustrating an example index trace from a spectrographic monitoring system showing a good data fit.

As shown in FIG. 4, the indexes corresponding to each measured spectrum can be plotted according to time or platen rotation. A polynomial function of known order, e.g., a first-order function (i.e., a line) is fit to the plotted index numbers, e.g., using robust line fitting. Where the line meets the target index defines the endpoint time or rotation. For example, a first-order function is fit to the data points as shown in FIG. 4.

Without being limited to any particular theory, some libraries can predict proper endpoints better than others because they match the measured data more consistently. For example, out of multiple libraries representing substrates (or zones within a substrate) with different underlying layer thickness, the library which is the closest match to the underlying layer thickness of the measured zone should provide the best match. Thus a benefit of the methods described herein is a more accurate endpoint detection system achieved by utilizing multiple reference spectra libraries. In particular, a different reference spectra library can be used for each zone of a substrate. In addition, each zone can have multiple different reference spectra libraries.

Figure 5:
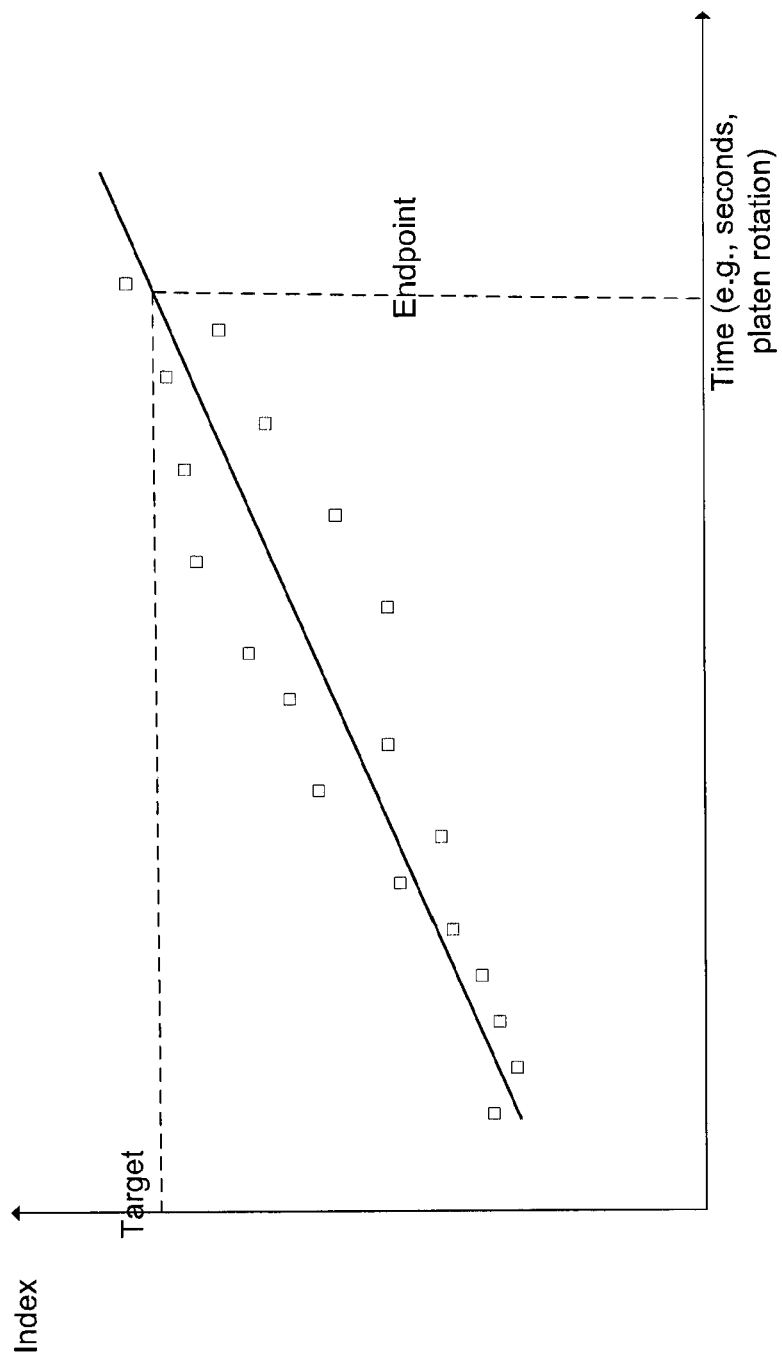
FIG. 5 is a schematic diagram illustrating an example index trace from a spectrographic monitoring system showing a poorer fit.

For example, FIG. 4 is a schematic diagram illustrating an example index trace from a spectrographic monitoring system showing a good data fit that corresponds to a first zone on a substrate. In comparison, FIG. 5 is a schematic diagram illustrating an example index trace from a spectrographic monitoring system showing a poorer data fit to a second zone on the substrate. The example index traces of FIG. 4 and FIG. 5 represent index traces generated using a same reference spectra library. The plotted index numbers in FIG. 5 have a greater amount of difference from an associated robust line, relatively, as compared to the differences from an associated robust line and index trace associated with plotted index numbers in FIG. 4. Therefore, it can be advantageous to use different reference spectra libraries for different zones on a substrate.

In some implementations, a spectrum is obtained at more than one radial position of the substrate. For each spectra measurement, the radial position on the substrate can be determined, and the spectra measurements can be binned into zones based on their radial positions (e.g., radial zones). A substrate can have multiple zones, such as a center zone, a middle zone and an edge zone, as described above. The position from which the spectra is obtained can be determined, such as by using the method described in U.S. Pat. No. 7,097,537, or as described in U.S. Pat. No. 7,018,271, incorporated herein by reference for all purposes.

The measured spectra from each zone (or, for each zone, an average of spectra from within the zone obtained from a single sweep of the sensor across the substrate) are compared to the reference spectra in one or more of a plurality of reference spectra libraries, as described above, and the corresponding index number is determined from the comparison with the spectra library. The corresponding index numbers for each zone can be used to generate an index trace, and the index trace can be used to determine a goodness of fit.

Figure 6:
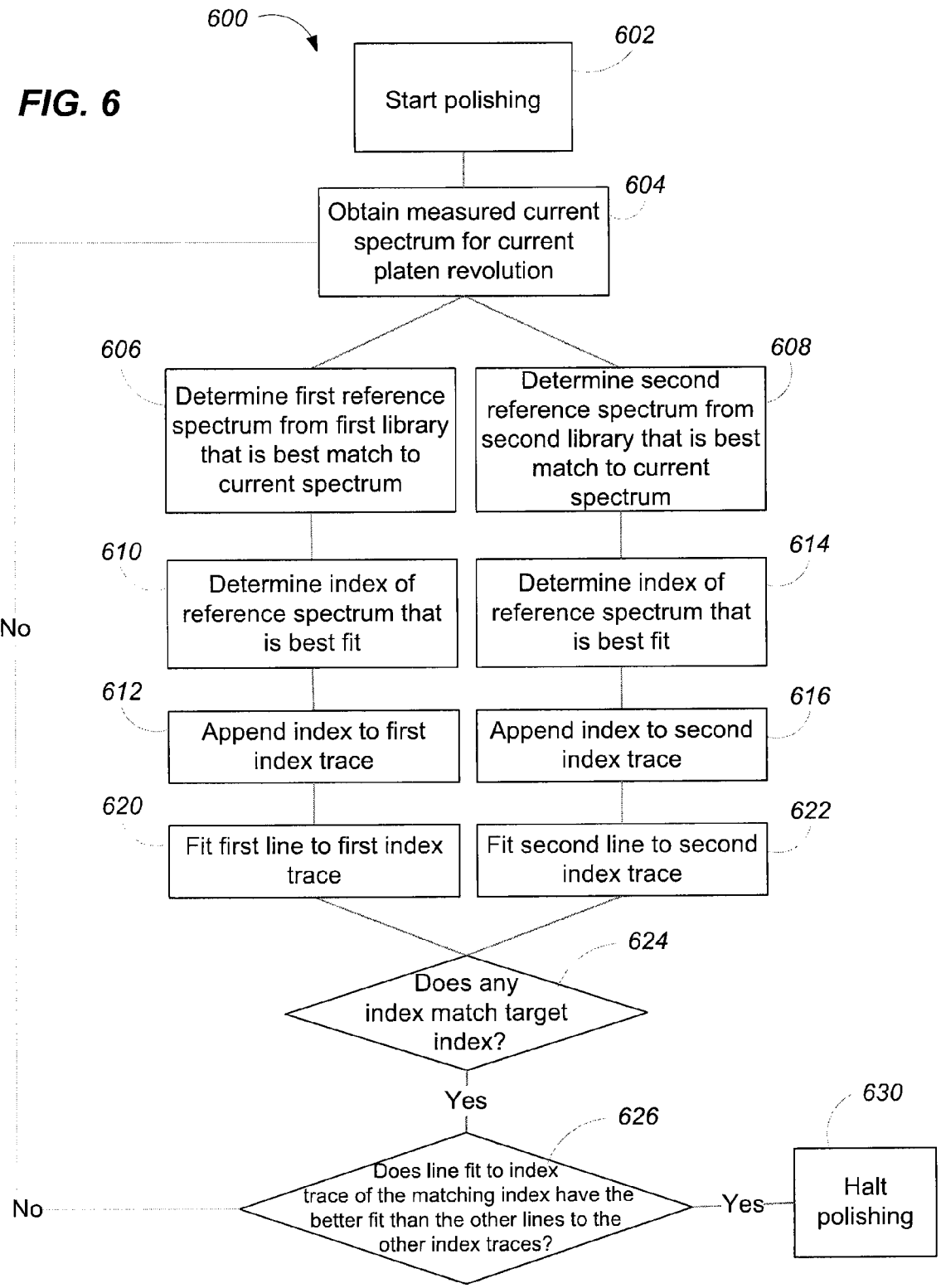
FIG. 6 is a flow diagram of an implementation of determining a polishing endpoint.

FIG. 6 shows a method 600 for determining an endpoint of a polishing step. A substrate from the batch of substrates is polished (step 602), and for each zone of the substrate, the following steps are performed for each platen revolution. One or more spectra are measured to obtain a current spectrum for a current platen revolution (step 604). A first best-match reference spectrum stored in a first spectra library which best fits the current spectrum is determined (step 606). A second best-match reference spectrum stored in a second spectra library which best fits the current spectra is determined (step 608). More generally, for each library being used for the zone, the reference spectrum that is the best-match to the current spectrum is determined. The index of the first best-matched reference spectrum from the first library that is the best fit to the current spectrum is determined (step 610), and is appended to a first index trace (step 612) associated with the first library. The index of the second best-match reference spectra from the second library that is the best fit to the current spectrum is determined (step 614), and is appended to a second index trace (step 616) associated with the second library. More generally, for each library, the index for each best-match reference spectrum is determined and appended to an index trace for the associated library. A first line is fit to the first index trace (step 620), and a second line is fit to the second index trace (step 622). More generally, for each index trace, a line can be fit to the index trace. The lines can be fit using robust line fitting.

Endpoint can be called (step 630) when the index of the first best-match spectra matches or exceeds the target index (step 624) and the index trace associated with the first spectra library has the best goodness of fit to the robust line associated with the first spectra library (step 626), or when the index of the second best-match spectra matches or exceeds the target index (step 624) and the index trace associated with the second spectra library has the best goodness of fit to the robust line associated with the second spectra library (step 626). More generally, endpoint can be called when the index trace with the best fit to its associated fitted line matches or exceeds the target index.

Although two libraries are discussed above, the technique can be used with three or more libraries. In addition, some, all or none of the libraries can be shared between zones, e.g., some, all or no libraries for one zone can be used with another zone.

Also, rather than comparing the index values themselves to the target index, the value of the fitted line at the current time can be compared to the target index. That is, a value (which need not be an integer in this context) is calculated for the current time from the linear function, and this value is compared to the target index.

Using method 600, for example, different reference spectra libraries can be used to determine polishing endpoints for different zones of the substrate. In particular, the reference spectra library that produces an index trace with the best goodness of fit for a particular zone is used. In these and other implementations, some zones could use the same reference spectra library, while some zones may use different reference spectra libraries. In some implementations, subsets of a plurality of reference spectra libraries can be predetermined (e.g., user-selected) to limit the number of libraries that are used for each zone. For example, two or more reference libraries can be predetermined for use with each zone. In some implementations, a particular reference spectra library can be identified for each zone based on goodness of fit. For example, during a predetermined time period during the polishing process (e.g., first 10-20 seconds of the polish), the particular reference spectra library to be used for each zone, e.g., a best library for a zone, can be selected based on the reference spectra library that produces the best goodness of fit during the predetermined time period.

Other implementations are possible. For example, although two libraries are discussed above, the technique can be used with three or more libraries. As another example, some, all or none of the libraries can be shared between zones, e.g., some, all or no libraries for one zone can be used with another zone. As yet another example, exactly one reference spectra library can be predetermined for use with each zone, such that a different reference spectra library is used for each zone. For this implementation, there is no selection of a reference library based on goodness of fit; rather reliability of endpointing can be improved simply by using different reference libraries for the different zones.

Determining whether an index trace associated with a spectra library has the best goodness of fit to the linear function associated with the library can include determining whether the index trace of the associated spectra library has the least amount of difference from the associated robust line, relatively, as compared to the differences from the associated robust line and index trace associated with another library, e.g., the lowest standard deviation, the greatest correlation, or other measure of variance. In one implementation, the goodness of fit is determined by calculating a sum of squared differences between the index data points and the linear function; the library with the lowest sum of squared differences has the best fit.

If one of the index traces reaches the target index but is not the best fit, then the system can wait until the either that index trace is the best fit, or the index trace that is the best fit reaches the target index.

Although only two libraries and two index traces are discussed above, the concept is applicable to more than two libraries that would provide more than two index traces. In addition, rather than calling endpoint when the index of the trace matches a target index, endpoint could be called at the time calculated for the line fit to the trace to cross the target index. Moreover, it would be possible to reject the index traces with worst fit before the endpoint, e.g., about 40% to 60% through the expected polishing time, in order to reduce processing.

Obtaining a current spectra can include measuring at least one spectrum of light reflecting off a substrate surface being polished (step 604). Optionally, multiple spectra can be measured, e.g., spectra measured at different radii on the substrate can be obtained from a single rotation of platen, e.g., at points 301-311 (FIG. 3). If multiple spectra are measured, a subset of one or more of the spectra can be selected for use in the endpoint detection algorithm. For example, spectra measured at sample locations near the center of the substrate (for example, at points 305, 306, and 307 shown in FIG. 3) could be selected. The spectra measured during the current platen revolution are optionally processed to enhance accuracy and/or precision.

Determining a difference between each of the selected measured spectra and each of the reference spectra (step 606 or 610) can include calculating the difference as a sum of differences in intensities over a range of wavelengths. That is, $$\text{Difference} = \sum_{\lambda=a}^{b} \text{abs}(I_{current}(\lambda) - I_{reference}(\lambda))$$

where a and b are the lower limit and upper limit of the range of wavelengths of a spectrum, respectively, and $I_{current}(\lambda)$ and $I_{reference}(\lambda)$ are the intensity of a current spectra and the intensity of the reference spectra for a given wavelength, respectively. Alternatively, the difference can be calculated as a mean square error, that is:

$$\text{Difference} = \sum_{\lambda=a}^{b} (I_{current}(\lambda) - I_{reference}(\lambda))^2$$

Where there are multiple current spectra for each zone, a best match can be determined between each of the current spectra and each of the reference spectra of a given library for that zone. Each selected current spectra is compared against each reference spectra. Given current spectra e, f, and g, and reference spectra E, F, and G, for example, a matching coefficient could be calculated for each of the following combinations of current and reference spectra: e and E, e and F, e and G, f and E, f and F, f and G, g and E, g and F, and g and G. Whichever matching coefficient indicates the best match, e.g., is the smallest, determines the reference spectrum, and thus the index.

Determining whether an index trace associated with a spectra library has the best goodness of fit to the robust line associated with the spectra library (step 620 or 624) may include determining which library has the least sum of squared differences between the data points comprising an index trace and the robust line fitted to the associated with the spectra library. For example, the least sum of squared differences between the data points as represented in FIG. 4 and FIG. 5 and their respective associated robust lines.

In some implementations, the expected endpoint time is determined for one zone, such as the center zone. The polishing rates within the other zones are then adjusted, if appropriate, to achieve their desired endpoints at the same time as the expected endpoint time for the selected zone, e.g., the center zone. The polishing rates can be adjusted, such as by increasing or decreasing the pressure in a corresponding zone in the carrier head. In some carrier heads, such as the carrier head described in U.S. Publication No. 2005-0211377, the carrier head has adjustable pressure zones. The change in polishing rate can be assumed to be directly proportional to the change in pressure, e.g., a simple Prestonian model. Additionally, a control model for polishing the substrates can be developed that takes into account the influences of platen or head rotational speed, second order effects of different head pressure combinations, the polishing temperature, slurry flow, or other parameters that affect the polishing rate.

Figure 7:
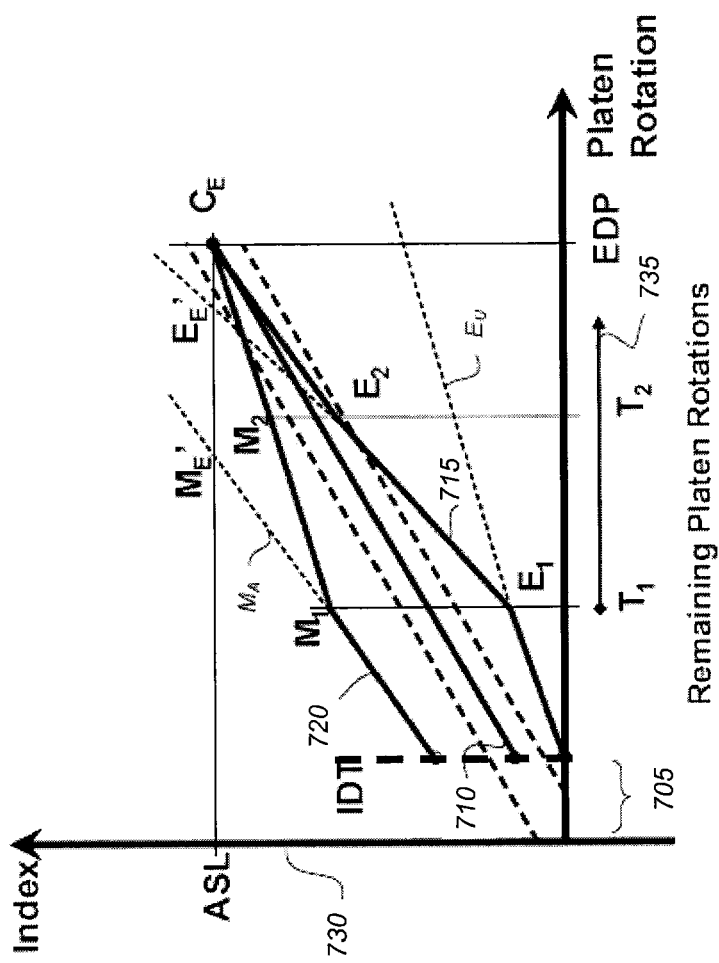
FIG. 7 illustrates an example graph of polishing progress versus time for a process in which the polishing rates are adjusted.

Referring to FIG. 7, if a particular profile is desired, such as a uniform thickness across the surface of the substrate, the slope of the polishing rate, as indicated by the change in index numbers according to time, can be monitored and the polishing rate adjusted if the goodness of fit of the index trace indicates that the spectra measurements are reliable (e.g., the goodness of fit is less than a predetermined threshold value). After a polishing stabilizing period 705, a spectrum is obtained at the center zone 710, at the edge zone 715 and in between at a middle zone 720. Here, the zones are circular or annular zones. Each spectrum is correlated to its respective index. This process is repeated over a number of platen rotations, or over time, and the polishing rate at each of the center zone 710, middle zone 720 and edge zone 715 is determined. The polishing rate is indicated by the slope of the line that is obtained by plotting the index 730 (y-axis) according to the number of rotations 735 (x-axis). If any of the rates is calculated to be faster or slower than the others, the rate in the zone can be adjusted if the goodness of fit of the index trace indicates that the spectra measurements are reliable. Here, the adjustment is based on the endpoint $C_E$ of the center zone 710. For some implementations, if the polishing rates are within an acceptable margin, no adjustment need be made. An approximate polish end point EDP is known from polishing similar substrates with similar polishing parameters or from using the difference method described above. At a first polishing time $T_1$ during the polishing process, the rate of polishing at the middle zone 720 is decreased and the rate of polishing at the edge zone is increased. Without adjusting the polishing rate at the middle zone 720, the middle zone would be polished faster than the rest of the substrate, being polished at an overpolish rate of $M_A$. Without adjusting the polishing rate at $T_1$ for the edge zone 715, the edge zone 715 would be underpolished at a rate of $E_u$.

At a subsequent time ($T_2$) during the polishing process, the rates can again be adjusted, if appropriate. The goal in this polishing process is to end polishing when the substrate has a flat surface, or an oxide layer across the surface that is relatively even. One way of determining the amount to adjust the rate of polishing is to adjust the rates so that the index of each of the center, middle and edge zones are equal at the approximate polish end point EDP. Thus, the polishing rate at the edge zone needs adjusting while the center and middle zones are polished at the same rate as prior to $T_2$. If the EDP is approximate, polishing can be stopped when the index at each zone is in the desired location, that is, when each location has the same index.

During the polishing process, it is preferred to only make changes in the polishing rates a few times, such as four, three, two or only one time. The adjustment can be made near the beginning, at the middle or toward the end of the polishing process. Associating the spectra with an index number creates a linear comparison for polishing at each of the zones and can simplify calculations required to determine how to control the polishing process and obviate complex software or processing steps.

A method that can be applied during the endpoint process is to limit the portion of the library that is searched for matching spectra. The library typically includes a wider range of spectra than will be obtained while polishing a substrate. The wider range accounts for spectra obtained from a thicker starting outermost layer and spectra obtained after overpolishing. During substrate polishing, the library searching is limited to a predetermined range of library spectra. In some embodiments, the current rotational index N of a substrate being polished is determined. N can be determined by searching all of the library spectra. For the spectra obtained during a subsequent rotation, the library is searched within a range of freedom of N. That is, if during one rotation the index number is found to be N, during a subsequent rotation which is X rotations later, where the freedom is Y, the range that will be searched from (N+X)−Y to (N+X)+Y. For example, if at the first polishing rotation of a substrate, the matching index is found to be 8 and the freedom is selected to be 5, for spectra obtained during the second rotation, only spectra corresponding to index numbers 9±5 are examined for a match. When this method is applied, the same method can be independently applied to all of the libraries currently being used in the endpoint detection process.

Implementations and all of the functional operations described in this specification can be implemented in digital electronic circuitry, or in computer software, firmware, or hardware, including the structural means disclosed in this specification and structural equivalents thereof, or in combinations of them. Implementations can be implemented as one or more computer program products, i.e., one or more computer programs tangibly embodied in an information carrier, e.g., in a machine-readable storage media, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

The above described polishing apparatus and methods can be applied in a variety of polishing systems. Either the polishing pad, or the carrier head, or both can move to provide relative motion between the polishing surface and the substrate. For example, the platen may orbit rather than rotate. The polishing pad can be a circular (or some other shape) pad secured to the platen. Some aspects of the endpoint detection system may be applicable to linear polishing systems, e.g., where the polishing pad is a continuous or a reel-to-reel belt that moves linearly. The polishing layer can be a standard (for example, polyurethane with or without fillers) polishing material, a soft material, or a fixed-abrasive material. Terms of relative positioning are used; it should be understood that the polishing surface and substrate can be held in a vertical orientation or some other orientation.

Particular embodiments of the invention have been described. Other embodiments are within the scope of the following claims. For example, the actions recited in the claims can be performed in a different order and still achieve desirable results.

What is claimed is:

1. A method of controlling a chemical mechanical polishing operation, comprising:
polishing a substrate, wherein polishing the substrate comprises rotating a platen;
storing a library having a plurality of reference spectra, each reference spectrum of the plurality of reference spectra having a stored associated value, and wherein each stored associated value is a number of rotations of the platen at which the reference spectrum with the stored associated value is expected to be observed from the substrate undergoing polishing;
measuring a sequence of spectra from the substrate in-situ during polishing to obtain measured spectra;
for each measured spectrum of the sequence of spectra, finding a best matching reference spectrum from the plurality of reference spectra to generate a sequence of best matching reference spectra;
determining the stored associated value for each best matching spectrum from the sequence of best matching reference spectra to generate a sequence of values;
fitting a function to the sequence of values; and
at least one of adjusting a polishing rate or halting polishing based on the function.

2. The method of claim 1, wherein the function is a linear function.

3. The method of claim 2, comprising calculating a time at which the function equals a target value, and halting polishing at the calculated time.

4. The method of claim 1, wherein each reference spectrum in the library has a unique associated value.

5. The method of claim 1, wherein the sequence of values provides a trace.

6. The method of claim 5, further comprising smoothing the trace.

7. A non-transitory computer readable storage medium storing a computer program, which, when executed by a computer processor of a polishing system, causes the polishing system to perform operations comprising:
polishing a substrate, wherein polishing the substrate comprises rotating a platen;
storing a library having a plurality of reference spectra, each reference spectrum of the plurality of reference spectra having a stored associated value, and wherein each stored associated value is a number of rotations of the platen at which the reference spectrum with the stored associated value is expected to be observed from the substrate undergoing polishing;
measuring a sequence of spectra from the substrate in-situ during polishing to obtain measured spectra;
for each measured spectrum of the sequence of spectra, finding a best matching reference spectrum from the plurality of reference spectra to generate a sequence of best matching reference spectra;

determining the stored associated value for each best matching spectrum from the sequence of best matching reference spectra to generate a sequence of values;

fitting a function to the sequence of values; and at least one of adjusting a polishing rate or halting polishing based on the function.

8. The computer readable storage medium of claim 7, wherein the function is a linear function.

9. The computer readable storage medium of claim 8, comprising calculating a time at which the function equals a target value, and halting polishing at the calculated time.

10. The computer readable storage medium of claim 7, wherein each reference spectrum in the library has a unique associated value.

11. The computer readable storage medium of claim 7, wherein the sequence of values provides a trace.

12. The computer readable storage medium of claim 11, further comprising smoothing the trace.

13. A chemical mechanical polishing system, comprising:

a rotatable platen;

a carrier head to hold a substrate against a polishing pad on the platen;

an in-situ optical monitoring system to measure a sequence of spectra during polishing to obtain measured spectra; and a controller configured to store a library having a plurality of reference spectra, each reference spectrum of the plurality of reference spectra having a stored associated value, and wherein each stored associated value is a number of rotations of the platen at which the reference spectrum with the stored associated value is expected to be observed from the substrate undergoing polishing, receive the sequence of spectra from the substrate from the in-situ optical monitoring system, for each measured spectrum of the sequence of spectra, find a best matching reference spectrum from the plurality of reference spectra to generate a sequence of best matching reference spectra, determine the stored associated value for each best matching spectrum from the sequence of best matching reference spectra to generate a sequence of values, fit a function to the sequence of values, and at least one of adjusting a polishing rate or halting polishing based on the function.

14. The chemical mechanical polishing system of claim 13, wherein the function is a linear function.

15. The chemical mechanical polishing system of claim 14, wherein the controller is configured to calculate a time at which the function equals a target value, and halt polishing at the calculated time.

16. The chemical mechanical polishing system of claim 13, wherein each reference spectrum in the library has a unique associated value.

17. The chemical mechanical polishing system of claim 13, wherein the sequence of values provides a trace.

18. The chemical mechanical polishing system of claim 17, wherein the controller is configured to smooth the trace.

* * * * *